US012686361B2

(12) United States Patent
Gerardiere et al.

(10) Patent No.: US 12,686,361 B2
(45) Date of Patent: Jul. 21, 2026

(54) SYSTEM FOR MANAGING A SENSOR FOR DETECTING AN INTENTION TO OPEN AND/OR UNLOCK AN OPENING PANEL OF A MOTOR VEHICLE

(71) Applicant: VITESCO TECHNOLOGIES GmbH, Regensburg (DE)

(72) Inventors: Olivier Gerardiere, Toulouse (FR); Maxime Rateau, Toulouse (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 0 days.

(21) Appl. No.: 18/851,001

(22) PCT Filed: May 5, 2023

(86) PCT No.: PCT/EP2023/061893
§ 371 (c)(1),
(2) Date: Sep. 25, 2024

(87) PCT Pub. No.: WO2023/217641
PCT Pub. Date: Nov. 16, 2023

(65) Prior Publication Data
US 2025/0206261 A1      Jun. 26, 2025

(30) Foreign Application Priority Data
May 11, 2022    (FR) ..................................... 2204451

(51) Int. Cl.
B60R 25/24        (2013.01)
B60R 25/31        (2013.01)
(52) U.S. Cl.
CPC .............. B60R 25/24 (2013.01); B60R 25/31 (2013.01); B60R 2325/10 (2013.01)

(58) Field of Classification Search
CPC ...... B60R 25/24; B60R 25/31; B60R 2325/10
See application file for complete search history.

(56) References Cited

U.S. PATENT DOCUMENTS 6,963,794 B2 * 11/2005 Geber ................... B60R 25/406
                                                    340/426.36
7,205,884 B2 * 4/2007 Kumazaki .......... G07C 9/00309
                                                    340/5.61
(Continued)

FOREIGN PATENT DOCUMENTS

CN        113224506 A      8/2021
DE     102018221743 B3     1/2020
WO        2015040835 A1    3/2015

OTHER PUBLICATIONS

International Search Report and Written Opinion of the ISA for PCT/EP2023/061893, mailed Aug. 2, 2023, 16 pages.

*Primary Examiner* — Thomas D Alunkal
(74) *Attorney, Agent, or Firm* — NIXON & VANDERHYE

(57) ABSTRACT
A system that is intended to be integrated into a motor vehicle, includes a medium-range detection module for measuring a current distance relative to a portable user authentication device; and an intention sensor for detecting an intention to open and/or unlock an opening panel of the motor vehicle. The medium-range detection module has a standby state and an active state. It is able to receive control data for controlling its standby or active state, and, in response, to switch from its standby state to its active state. The intention sensor has a standby state and an active state. It is able to receive control data for controlling its standby or active state, and, in response, to switch from its standby state to its active state, with said control data depending on a detection carried out by the medium-range detection module.

8 Claims, 2 Drawing Sheets

(56)             References Cited

U.S. PATENT DOCUMENTS

| 10,328,900 | B1 | 6/2019 | Yakovenko et al. | |
|---|---|---|---|---|
| 10,443,292 | B2 * | 10/2019 | Baruco | E05F 15/622 |
| 11,094,150 | B2 * | 8/2021 | Ghabra | G07C 9/00174 |
| 11,752,974 | B2 * | 9/2023 | Hassani | G06V 40/172 |
| | | | | 701/36 |
| 2007/0200670 | A1 * | 8/2007 | McBride | G07C 9/00309 |
| | | | | 340/5.23 |
| 2016/0083995 | A1 | 3/2016 | Dezorzi et al. | |
| 2016/0189460 | A1 * | 6/2016 | Watanabe | G05B 15/02 |
| | | | | 700/275 |
| 2016/0241999 | A1 | 8/2016 | Chin et al. | |
| 2019/0297457 | A1 | 9/2019 | Ledvina et al. | |
| 2019/0330908 | A1 * | 10/2019 | Tofilescu | G06V 40/20 |
| 2021/0367937 | A1 * | 11/2021 | Ohashi | H04W 12/61 |
| 2022/0024415 | A1 | 1/2022 | Wu et al. | |

* cited by examiner

SYSTEM FOR MANAGING A SENSOR FOR DETECTING AN INTENTION TO OPEN AND/OR UNLOCK AN OPENING PANEL OF A MOTOR VEHICLE

CROSS-REFERENCE TO RELATED APPLICATIONS

This application is the U.S. national phase of International Application No. PCT/EP2023/061893 filed May 5, 2023 which designated the U.S. and claims priority to FR 2204451 filed May 11, 2022, the entire contents of each of which are hereby incorporated by reference.

TECHNICAL FIELD

The invention relates to the field of motor vehicles and more specifically to the field of detecting an intention to open and/or unlock an opening panel of a motor vehicle.

PRIOR ART

Intention sensors are known in the prior art that are intended for detecting the intention of a user to open and/or unlock an opening panel of a motor vehicle. Detecting this intention allows said opening or said unlocking to be automatically controlled for optimal user comfort.

Such an intention sensor can be made up of a presence sensor, of the capacitive type, for example. Such a sensor comprises a measurement electrode, the capacitance value of which depends on whether or not the hand of a human operator is present in close proximity.

As a variant, an intention sensor can comprise a gesture detector that is based, for example, on radar technology and is configured to detect a predetermined gesture made by a human operator in the vicinity of the vehicle.

In a manner per se known, and in order to limit its electricity consumption, the intention sensor is activated intermittently, with a predetermined activation period.

An aim of the present invention is to propose a solution for reducing the electricity consumption of such an intention sensor.

DISCLOSURE OF THE INVENTION

This aim is achieved with a system for managing an intention sensor, the system comprising:

a medium-range detection module that is intended to be integrated into the motor vehicle and is able to measure a current distance relative to a portable user authentication device; and an intention sensor that is intended to be integrated into the motor vehicle and is able to detect an intention, expressed by a user, to open and/or unlock an opening panel of the motor vehicle.

According to the invention:

the medium-range detection module has a standby state and an active state and it is configured to measure said current distance when it is in the active state only;

the medium-range detection module is able to receive control data as input for controlling its standby or active state, and, in response, to switch from its standby state to its active state;

the intention sensor has a standby state and an active state and it is configured to detect said intention to open and/or unlock an opening panel when it is in the active state only; and the intention sensor is able to receive control data as input for controlling its standby or active state, and, in response, to switch from its standby state to its active state, with said control data depending on a detection carried out by the medium-range detection module.

In the standby state, the medium-range detection module does not carry out any distance measurement. In the active state, the medium-range detection module can be switched on continuously, or intermittently in order to further reduce its electricity consumption.

Similarly, in the standby state, the intention sensor does not carry out any detection of an intention to open and/or unlock an opening panel. In the active state, it can be switched on continuously, or intermittently in order to further reduce its electricity consumption.

One of the ideas behind the invention thus involves no longer considering the intention sensor in isolation, but as forming part of a set of elements commonly integrated into a motor vehicle. Another idea behind the invention is to multiply the stages, or activation steps, so that the active state of the intention sensor is conditional upon two cumulative proximity conditions of a user.

Thus, in addition to an intention sensor as described in the introduction, it is common for a motor vehicle to be equipped with a medium-range detection module that is able to measure a current distance relative to a portable user authentication device. One of the ideas behind the invention involves using such a medium-range detection module in order to control the active or the standby state of the intention sensor.

According to the invention, the medium-range detection module is adapted so that it has a standby state and an active state, and so that it can receive and process control data for controlling its standby or active state. Thus, a first activation stage is associated with switching the medium-range detection module from its standby state to its active state.

Similarly, the intention sensor is adapted so that it has a standby state and an active state, and so that it can receive and process control data for controlling its standby or active state. A second activation stage is linked to switching the intention sensor from its standby state to its active state.

The medium-range detection module is configured to measure a current distance relative to the portable user authentication device. It allows the control data for the intention sensor to be generated as a function of at least one measured distance. These control data can be generated directly by the medium-range detection module. As a variant, these control data are generated by a central control unit, in response to data supplied by the medium-range detection module and relating to at least one measured distance.

Thus, the intention sensor is only switched to its active state when two conditions are successively met, namely:

1/the medium-range detection module receiving control data for controlling its standby or active state; and 2/the intention sensor receiving control data for controlling its standby or active state.

This two-stage activation allows the activation instants of the intention sensor to be limited to the strictest minimum and thus allows the electricity consumption thereof to be minimized.

Furthermore, this two-stage activation uses a medium-range detection module, which is simply adapted in order to be able to implement the invention. Thus, the invention does not require integrating additional components into the vehicle.

Advantageously, the medium-range detection module comprises at least one transmitter and receiver module that is configured to transmit and receive an ultra-wideband radio-frequency signal. Said ultra-wideband radiofrequency signal has a transmission spectral band, respectively a reception band, that is strictly greater than 500 MHz, or that is strictly greater than 20% of a central frequency of said transmission and reception spectral band, respectively, with the smallest of these two values being retained. Advantageously, the central frequency ranges between 2 GHz and 12 GHz, preferably between 3.1 GHz and 10.6 GHz. Preferably, the power spectral density is of the order of 40 dBm/MHz, advantageously ranging between 35 dBm/MHz and 45 dBm/ MHz, in particular equal to 41.3 dBm/MHz. Advantageously, the medium-range detection module is then based on technology, called ultra-wide band, or UWB, technology.

According to the invention, the control data for controlling the standby or active state of the medium-range detection module relate to the detection of the arrival of an authenticated user within a predetermined perimeter, called wide perimeter. These control data are provided using a long-range detection and authentication module. Such a module advantageously comprises a transmitter and receiver module that is configured to transmit and to receive a radio-frequency signal of the Bluetooth, or Bluetooth Low Energy (or BLE) type. It is common for a motor vehicle to be equipped with such a long-range detection and authentication module, so that, in this case again, the invention simply requires the adaptation of components that are already present in the vehicle.

The control data for controlling the standby or active state of the medium-range detection module can be generated directly by the long-range detection and authentication module. As a variant, these control data are generated by a central control unit, in response to data provided by the long-range detection and authentication module and relating to a user authentication.

The system according to the invention can also comprise said central control unit, comprising at least one processor, and configured for:

upon receiving data relating to at least one distance measured by the medium-range detection module, generating and sending, to the intention sensor, the control data for controlling the standby or active state thereof; and/or upon receiving data relating to a user authentication provided by the long-range detection and authentication module, generating and sending, to the medium-range detection module, the control data for controlling the standby or active state thereof.

According to the invention, in its active state, the medium-range detection module is configured to carry out successive measurements of current distance relative to the portable user authentication device, in order to detect the arrival of a user within a predetermined perimeter, called restricted perimeter.

Said control data for controlling the standby or active state of the intention sensor depend on data relating to the arrival of a user within the restricted perimeter, with these data being obtained using the medium-range detection module.

Preferably, said control data for controlling the standby or active state of the intention sensor depend on data relating to a movement of the user toward the motor vehicle, with these data being obtained by means of the medium-range detection module.

Advantageously, the intention sensor comprises a capacitive type presence sensor that is configured to be integrated into a handle on the motor vehicle and to detect the presence of a user in close proximity to said handle. The intention sensor can further comprise a short-range authentication module that is configured to exchange authentication data with the portable user authentication device so as to authenticate said user.

As a variant, the intention sensor can comprise a radar sensor that is configured for detecting gestures.

The system according to the invention further comprises a long-range detection and authentication module that is intended to be integrated into the motor vehicle and is configured to exchange data with the portable user authentication device so as to detect the arrival of an authenticated user within a perimeter, called wide perimeter, with the control data for controlling the standby or active state of the medium-range detection module depending on said detection.

The long-range detection and authentication module can comprise at least one radio-frequency module that is configured to transmit an ultra-high frequency radio-frequency signal with a carrier frequency higher than 2 GHZ.

The invention also relates to a method for waking-up an intention sensor, implemented within a system according to the invention, and which comprises the following steps, implemented from an initial state of the system in which each one from among the medium-range detection module and the intention sensor is in the standby state:

b2) the medium-range detection module receiving the control data for controlling its standby or active state, and, in response, switching the medium-range detection module from its standby state to its active state;

c) using the medium-range detection module for successively measuring a current distance between the medium-range detection module and the portable user authentication device, in order to detect the arrival of a user within a perimeter, called restricted perimeter;

d1) when the arrival of the user within the restricted perimeter is detected, generating and sending the control data for controlling the standby or active state of the intention sensor;

d2) the intention sensor receiving said control data for controlling its standby or active state, and, in response, switching the intention sensor from its standby state to its active state.

The method according to the invention is implemented in a system further comprising a long-range detection and authentication module that is configured to exchange data with the portable user authentication device so as to detect the arrival of an authenticated user within a perimeter, called wide perimeter, and the method further comprises the following steps:

a) using the long-range detection and authentication module for monitoring an environment of the vehicle in order to detect the arrival of an authenticated user within the wide perimeter;

b1) when the arrival of an authenticated user within the wide perimeter is detected, generating and sending control data for controlling the standby or active state of the medium-range detection module.

DESCRIPTION OF THE FIGURES

Further features and advantages of the invention will become more clearly apparent upon reading the following description. The description is purely illustrative and must be read with reference to the appended drawings, in which.

DETAILED DESCRIPTION OF AT LEAST ONE EMBODIMENT

A motor vehicle 10 comprising a system 100 according to the invention will be initially described with reference to FIG. 1.

The system 100 is able to communicate with a portable user authentication device 200.

The portable user authentication device 200 is formed, for example, by an authentication badge, or key fob. As a variant, it can include a smartphone. The portable user authentication device 200 is able to establish two-way wireless communication with at least one module located in the motor vehicle, and to provide an authentication key for discriminating a user authorized to access the vehicle from a user not authorized to access the vehicle. During use, the portable user authentication device 200 is carried by a user 210.

Figures 1, 2:
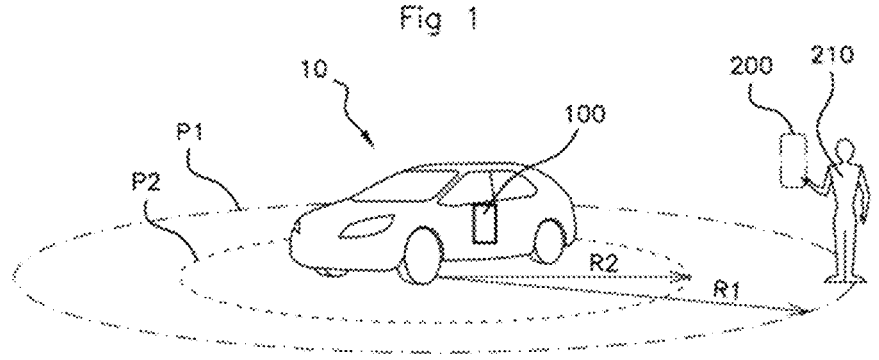
FIG. 1 schematically illustrates a motor vehicle comprising a system according to the invention, shown during use.
FIG. 2 schematically illustrates a system according to the invention.

FIG. 1 also shows a wide perimeter P1 and a restricted perimeter P2.

The wide perimeter P1 delimits a first surface, which is preferably circular, is centered on the motor vehicle 10 and has a first radius R1. Preferably, the radius R1 is greater than or equal to three meters, for example, ranging between 10 meters and 3 meters.

The restricted perimeter P2 delimits a second surface, which is preferably circular, is centered on the motor vehicle 10 and has a second radius R2 that is strictly less than R1. A ratio between the radii R1 and R2 is advantageously greater than or equal to 3. Preferably, the radius R2 is less than or equal to 1 meter, for example, ranging between 1 meter and 50 cm.

A more detailed description will now be provided, with reference to FIG. 2, of an embodiment of a system 100 according to the invention.

The system 100 comprises:

a medium-range detection module 110; and an intention sensor 120.

During use, the medium-range detection module 110 is integrated into the motor vehicle 10. It is integrated, for example, yet in a non-limiting manner, into a door handle, or into a lateral upright between two doors, or in the vicinity of a rear bumper. It can be integrated with the intention sensor 120 within the same housing, or it can be remote from said intention sensor 120.

The medium-range detection module 110 is able to measure at least one distance relative to the portable user authentication device 200. To this end, the medium-range detection module 110 is able to establish a two-way wireless communication 11 with the portable user authentication device 200, and to compute times-of-flight representing a current distance between said medium-range detection module 110 and the portable user authentication device 200. Advantageously, this two-way communication 11 uses an ultra-wide band, or UWB, radio-frequency signal. The spectral bandwidth of said radiofrequency signal is advantageously greater than 500 MHz, or greater than 20% of a central frequency of the transmission and reception spectral band, with the smallest of the two threshold values being selected. The medium-range detection module 110 comprises at least one radiofrequency signal transmission and reception module, and at least one signal processing module.

In FIG. 2, the portable user authentication device 200 is shown twice, at two different instants of the method according to the invention.

The medium-range detection module 110 differs from the equivalent modules of the prior art, notably in that it has a standby state and an active state, and in that it is able to switch from the standby state to the active state in response to receiving control data for controlling its standby or active state. Said control data are provided by an external module able to communicate with the medium-range detection module 110.

The standby state corresponds to an energy-saving mode, in which the medium-range detection module 110 does not transmit the radiofrequency signal that allows the current distance values to be computed.

The active state corresponds to a more energy-intensive mode, in which the medium-range detection module 110 transmits radiofrequency signals to and computes current distance values for the portable user authentication device 200. The active state can correspond to the continuous transmission of a signal, or to transmission at regular intervals in order to further limit the overall energy consumption of the medium-range detection module 110.

The medium-range detection module 110 is configured, when it is in the active state, to regularly measure a current distance to the portable user authentication device 200, in order to detect the arrival of a user within the restricted perimeter P2. The arrival of a user within the restricted perimeter P2 corresponds to a distance between the medium-range detection module 110 and the portable user authentication device 200 that is less than or equal to the radius R2 of the restricted perimeter P2.

The medium-range detection module 110 can be configured to directly or indirectly provide the intention sensor 120 with control data for controlling the standby or active state thereof.

These control data can be generated directly within the medium-range detection module 110 and then sent to the intention sensor 120 (direct supply).

As a variant, the medium-range detection module 110 sends data to a central control unit (not shown) that relates to a current distance to the user. When the current distance to the user indicates the arrival of a user within the restricted perimeter P2, the central control unit generates said control data and sends them to the intention sensor 120 (indirect supply). Such a central control unit can be formed by at least one processor, called BCM (Body Control Module) processor. The data exchanged between the medium-range detection module 110 and the central control unit, respectively between the central control unit and the intention sensor, are digital data.

In any case, the generation of said control data is subject to the detection of the arrival of a user within the restricted perimeter P2. When they are received by the intention sensor 120, these data switch said sensor from its standby state to its active state.

The control data for controlling the standby or active state of the intention sensor 120 can be generated provided that the distance between the medium-range detection module 110 and the portable user authentication device 200 is less than or equal to the radius R2 of the restricted perimeter P2. As a variant, there may be an additional condition for detecting an approach movement (distance between the medium-range detection module 110 and the portable user authentication device 200 that steadily decreases). It is thus possible to filter false positives, corresponding to the unintentional arrival of the user within the restricted perimeter P2, without intending to access the motor vehicle.

During use, the intention sensor 120 is integrated into the motor vehicle 0, for example, in a door handle, or in a lateral upright between two doors, or in the vicinity of a rear bumper.

It is able to detect an intention, expressed by a user located outside the motor vehicle 10, to open and/or unlock an opening panel of said vehicle.

Said intention can be expressed by the presence of the hand of the user, in close proximity to the intention sensor 120. Said sensor is then formed by a presence sensor, notably of the capacitive type. In a manner per se known, a capacitive-type presence sensor comprises a measurement electrode, the capacitance value of which depends on whether or not part of a human body is present in its immediate environment. Other types of presence sensor are also known, for example, based on an induction phenomenon. The intention sensor 120 can further comprise a signal processing module that is configured to generate and send an unlocking setpoint for an opening panel of the motor vehicle, in response to a presence being detected.

As a variant, said intention can be expressed by the fact that the human operator makes a predetermined gesture in the vicinity of the sensor, for example, a gesture of the foot or of the hand. The intention sensor 120 is then formed by a gesture detector, which advantageously comprises a transceiver, for sending and receiving a radiofrequency signal, and a signal processing module. The intention sensor 120 can further comprise a module configured to generate and send a setpoint for controlling the opening of an opening panel of the motor vehicle, in response to the detection of a predetermined gesture.

In the event that the intention sensor 120 is a presence sensor, it is advantageously accompanied by a short-range authentication module (not shown). Such a short-range authentication module advantageously comprises a near-field communication (NFC) antenna. Such a module is able to establish a directional wireless communication with the portable user authentication device 200, and to receive, from said device, an authentication key for discriminating a user authorized to access the vehicle from a user not authorized to access the vehicle. This key is used to check whether or not a setpoint for unlocking an opening panel of the motor vehicle has been sent. The short-range authentication module is advantageously integrated with the intention sensor 120 within the same housing, which is intended to be integrated into the motor vehicle, for example, within a handle.

The intention sensor 120 differs from the equivalent sensors of the prior art, notably in that it has a standby state and an active state, and in that it is able to switch from the standby state to the active state in response to receiving control data for controlling its standby or active state. As described above, these control data are obtained by means of the medium-range detection module 110, and can be generated directly in said module 110 or in a central control unit.

The standby state corresponds to an energy-saving mode, in which the intention sensor 120 does not enable the detection of an intention to open and/or unlock an opening panel (via the detection of a predetermined presence or gesture).

The active state corresponds to a more energy-intensive mode, in which the intention sensor 120 is able to detect an intention to open and/or unlock an opening panel. The active state can correspond to electrical power being supplied continuously or at regular intervals in order to further limit the electricity consumption of the intention sensor 120.

FIG. 2 also illustrates a long-range detection and authentication module 130. Said module is an integral part of the system according to the invention.

During use, the long-range detection and authentication module 130 is integrated into the motor vehicle 10. It is able to detect the arrival of an authenticated user within the wide perimeter P1. In other words, it is able to authenticate a user, and to detect that a distance between the long-range detection and authentication module 130 and the portable user authentication device 200 is less than or equal to the radius R1 of the wide perimeter P1. The user as mentioned above advantageously corresponds to said authenticated user.

The long-range detection and authentication module 130 both authenticates a user and detects the arrival of this user within the wide perimeter P1. To this end, the long-range detection and authentication module 130 is able to establish a two-way wireless communication 13 with the portable user authentication device 200, and to receive the authentication key from said device in order to discriminate a user authorized to access the vehicle from a user not authorized to access the vehicle. Advantageously, this two-way communication 13 uses an ultra-high frequency radiofrequency signal, with a frequency ranging between 300 MHz and 3 GHz, and more specifically between 2 GHz and 3 GHz, notably a Bluetooth signal. The long-range detection and authentication module 130 can comprise an ultra-high frequency radiofrequency signal transmission and reception module, preferably centrally positioned on the motor vehicle. The long-range detection and authentication module 130 further comprises at least one signal processing module that is able to carry out signal processing in order to obtain information relating to the arrival of an authenticated user within the wide perimeter P1. Said information can combine authentication information, linked to the reception of the authentication key, and distance information, linked, for example, to a time-of-flight computation. As a variant, said item of information can be a simple item of authentication information, with it being assumed that, in order for the long-range detection and authentication module 130 to be able to receive the authentication key, the portable user authentication device 200 must have entered the restricted perimeter P2.

The long-range detection and authentication module 130 is configured to directly or indirectly provide the medium-range detection module 110 with control data for controlling the standby or active state of said module 110.

These data can be directly generated within the long-range detection and authentication module 130, then sent to the medium-range detection module 110 (direct supply).

As a variant, the long-range detection and authentication module 130 sends data to a central control unit as described above that relates to a user authentication key and, if applicable, data that relates to a current distance to the user. When these data indicate the arrival of an authenticated user within the wide perimeter P1, the central control unit generates said control data and sends them to the medium-range detection module 110 (indirect supply). The data exchanged between the long-range detection and authentication module 130 and the central control unit, respectively between the central control unit and the medium-range detection module 110, are digital data.

In any case, the generation of said control data is subject to the detection of the arrival of an authenticated user within the wide perimeter P1. Said data, when they are received by the medium-range detection module 110, are able to cause it to switch from its standby state to its active state.

Figure 3:
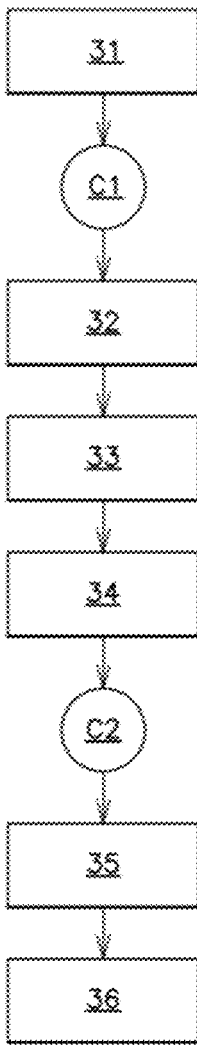
FIG. 3 schematically illustrates a method according to the invention.

An example of a method according to the invention will now be described with reference to FIG. 3, advantageously implemented in a system 100 as illustrated in FIG. 2.

For the sake of completeness, preliminary steps are also described that do not necessarily form an integral part of the method according to the invention.

The method according to the invention is implemented from an initial state of the system 100 according to the invention, in which the intention sensor 120 and the medium-range detection module 110 are each in their respective standby state.

The method firstly comprises a step 31 of monitoring the environment of the motor vehicle 10 with a view to detecting the arrival of an authenticated user within the wide perimeter P1 (see FIG. 1).

This preliminary step is advantageously implemented using the long-range detection and authentication module 130.

As described above, the detection of an authenticated user corresponds to the detection of a portable user authentication device 200, carrying an authentication key associated with a user authorized to access the motor vehicle 10. Data relating to the authorized identification keys can be stored inside the long-range detection and authentication module 130, or inside a remote memory.

When the arrival of an authenticated user within the wide perimeter P1 (condition C1) is detected, the method comprises a second preliminary step 32 involving generating control data for controlling the standby or active state of the medium-range detection module 110, and sending these data to said module 110.

This step 32 can be implemented directly by the long-range detection and authentication module 130. In a preferred variant, the long-range detection and authentication module 130 provides a central control unit as described above with data relating to the arrival of an authenticated user within the wide perimeter P1. Based on these data, the central control unit generates the control data for controlling the standby or active state of the medium-range detection module 110, and sends these data to said module 110.

In response to receiving these control data, the medium-range detection module 110 switches from its standby state to its active state (step 33). Steps 32 and 33 together form a step of controlling the medium-range detection module 110 so that it can transition from its standby state to its active state.

The method then comprises a step 34 of monitoring the environment of the motor vehicle, in order to detect the arrival of the authenticated user within the restricted perimeter P2. To this end, the medium-range detection module 110 carries out successive measurements of a current distance relative to the portable user authentication device 200, as described above.

When the arrival of the authenticated user within the restricted perimeter P2 (condition C2) is detected, the method comprises a step 35 involving generating control data for controlling the standby or active state of the intention sensor 120, and sending these data to said sensor 120.

This step 35 can be implemented directly by the medium-range detection module 110. In a preferred variant, the medium-range detection module 110 provides the central control unit with data relating to the arrival of the authenticated user within the restricted perimeter P2. Based on these data, the central control unit generates the control data for controlling the standby or active state of the intention sensor 120, and sends these data to said sensor 120.

In response to receiving these control data, the intention sensor 120 switches from its standby state to its active state (step 36). Steps 35 and 36 together form a step of controlling the intention sensor 120 so that it can transition from its standby state to its active state.

The method can then comprise a step, not shown, of detecting human presence in close proximity or of detecting a predetermined gesture using said intention sensor.

The method can then comprise a step involving said intention sensor controlling the opening or unlocking of an opening panel of the motor vehicle, in response to the detection of a human presence in close proximity to the sensor or in response to the detection of a predetermined gesture.

On completion of this step of controlling opening or unlocking of an opening panel, or after a predetermined time interval, or after completing any other predetermined condition, the system according to the invention can return to its initial state, in which the intention sensor and the medium-range detection module are each in a standby state.

The method according to the invention thus allows the intention sensor to wake up, allowing the electricity consumption of the intention sensor to be limited as much as possible.

If applicable, the intention sensor 120 can comprise a short-range authentication module that is able to receive the authentication key of the portable user authentication device 200 and to confirm, or optionally disconfirm, the authentication carried out by the long-range detection and authentication module 130.

The invention allows the electricity consumption of the intention sensor to be limited as much as possible. The state of charge of at least one battery of the motor vehicle is thus preserved as much as possible. In addition, this allows new functions to be added to the intention sensor, without increasing the electricity consumption. For example, the intention sensor can comprise both a presence sensor and a short-range authentication module, while offering low electricity consumption.

The invention also allows the average electricity consumption of the medium-range detection module to be reduced.

The invention claimed is:

1. A system for managing an intention sensor, the system comprising:

a long-range detector and authenticator configured to be integrated into the motor vehicle and to exchange data user with a portable authentication device to detect an arrival of an authenticated user within a wide perimeter;

a medium-range detector configured to be integrated into the motor vehicle and to measure a current distance relative to the portable user authentication device via a two-way communication therewith; and an intention sensor configured to be integrated into the motor vehicle and is able to detect an intention, expressed by a user, to one or more of open and unlock an opening panel of the motor vehicle, wherein the medium-range detector has a standby state and an active state, the medium-range detector being configured to receive control data as input sto control the standby state or the active state, and, in response, to switch from the standby state to the active state, with said control data depending on the long-range detector and authenticator detecting the arrival of the authenticated user within the wide perimeter, in the active state only of the medium-range detector, the medium-range detector is configured to carry out successive measurements of current distance relative to the portable user authentication device, in order to detect the arrival of the authenticated user within a predetermined restricted perimeter, the intention sensor has a standby state and an active state, the intention sensor being configured to detect said intention to one or more of open and unlock the opening panel when it the intention sensor is in the active state only, and the intention sensor is configured to receive control data as input to control the standby state or the active state, and, in response, to switch from the standby state to the active state of the intention sensor, with said control data depending on the medium-range detector detecting the arrival of the user within the restricted perimeter.

2. The system as claimed in claim 1, wherein the medium-range detector comprises at least one transmitter and receiver system that is configured to transmit and receive an ultra-wideband radio-frequency signal, having a spectral band with a width that is strictly greater than 500 MHz or is strictly greater than 20% of a central frequency of said spectral band.

3. The system as claimed in claim 1, wherein said control data to control the standby state or the active state of the intention sensor depend on data relating to a movement of the user toward the motor vehicle, the control data being obtained using the medium-range detector.

4. The system as claimed in claim 1, wherein the intention sensor comprises a capacitive-type presence sensor that is configured to be integrated into a handle on the motor vehicle and to detect the presence of the user in close proximity to said handle.

5. The system as claimed in claim 4, wherein the intention sensor further comprises a short-range authenticator that is configured to exchange authentication data with the portable user authentication device to authenticate said user.

6. The system as claimed in claim 1, wherein the intention sensor comprises a radar sensor that is configured to detect gestures.

7. The system as claimed in claim 1, wherein the long-range detector and authenticator comprises at least one radio-frequency system that is configured to transmit an ultra-high frequency radio-frequency signal with a carrier frequency higher than 2 GHZ.

8. A method for waking-up the intention sensor, implemented within the system as claimed in claim 1, the method comprising: implemented from an initial state of the system in which each one from among the medium-range detector and the intention sensor is in the standby state:

using the long-range detector and authenticator to monitor an environment of the vehicle in order to detect the arrival of an authenticated user within the wide perimeter;

when the arrival of an authenticated user within the wide perimeter is detected, generating and sending control data to control the standby state or the active state of the medium-range detector;

receiving, by the medium-range detector, control data for controlling its to control the standby state or the active state of the medium-range detector, and, in response, switching the medium-range detector from the standby state of the medium-range detector to the active state of the medium-range detector;

using the medium-range detector to successively measure a current distance between the medium-range detector and the portable user authentication device, in order to detect the arrival of a user within a restricted perimeter;

when the arrival of the user within the restricted perimeter is detected, generating and sending the control data to control the standby state or the active state of the intention sensor; and receiving, by the intention sensor said control data to control the standby state or the active state of the intention sensor, and, in response, switching the intention sensor from the standby state to the active state of the intention sensor.

* * * * *